US008173962B2

(12) United States Patent
Sutani et al.

(10) Patent No.: US 8,173,962 B2
(45) Date of Patent: May 8, 2012

(54) PATTERN DISPLACEMENT MEASURING METHOD AND PATTERN MEASURING DEVICE

(75) Inventors: Takumichi Sutani, Hitachinaka (JP); Ryoichi Matsuoka, Yotsukaido (JP); Hidetoshi Morokuma, Hitachinaka (JP); Akiyuki Sugiyama, Hitachinaka (JP); Hiroyuki Shindo, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 61 days.

(21) Appl. No.: 12/708,148

(22) Filed: Feb. 18, 2010

(65) Prior Publication Data
US 2010/0140472 A1 Jun. 10, 2010

Related U.S. Application Data

(63) Continuation of application No. 11/892,675, filed on Aug. 24, 2007, now Pat. No. 7,679,055.

(30) Foreign Application Priority Data

Aug. 31, 2006 (JP) .................. 2006-235876

(51) Int. Cl.
*A61N 5/00* (2006.01)
*G06K 9/00* (2006.01)
*G01C 25/00* (2006.01)
*G01R 31/00* (2006.01)

(52) U.S. Cl. ............. 250/307; 250/306; 250/492.2; 382/141; 382/144; 382/145; 702/94; 702/97; 702/155; 702/158; 324/750.01; 324/750.02; 324/762.01; 324/762.05

(58) Field of Classification Search .................. 250/306, 250/307, 309–311, 492.1, 492.2, 492.3; 382/125, 382/126, 141, 143–147, 149, 151, 199; 702/85, 702/86, 94, 95, 97, 155, 158; 324/750.01, 324/750.02, 754.18, 754.19, 754.22, 762.01, 324/762.05, 763.01
See application file for complete search history.

(56) References Cited

U.S. PATENT DOCUMENTS

| 5,498,877 A | 3/1996 | Shiraki |
| 5,543,921 A | 8/1996 | Uzawa et al. |
| 5,646,452 A | 7/1997 | Narimatsu |

(Continued)

FOREIGN PATENT DOCUMENTS

CN 1205545 A 1/1999
(Continued)

OTHER PUBLICATIONS

Chinese Office Action issued in Chinese Patent Application No. 200710140759.X, mailed on Apr. 17, 2009.

(Continued)

*Primary Examiner* — Bernard E Souw
(74) *Attorney, Agent, or Firm* — McDermott Will & Emery LLP

(57) ABSTRACT

An evaluation method and apparatus is provided for evaluating a displacement between patterns of a pattern image by using design data representative of a plurality of patterns superimposed ideally. A first distance is measured for an upper layer pattern between a line segment of the design data and an edge of the charged particle radiation image, a second distance is measured for a lower layer pattern between a line segment of the design data and an edge of the charged particle radiation image; and an superimposition displacement is detected between the upper layer pattern and lower layer pattern in accordance with the first distance and second distance.

4 Claims, 10 Drawing Sheets

U.S. PATENT DOCUMENTS

| | | | |
|---|---|---|---|
| 6,374,397 B1 | 4/2002 | Miyamoto et al. | |
| 6,868,175 B1 * | 3/2005 | Yamamoto et al. | 382/145 |
| 7,518,110 B2 * | 4/2009 | Sutani et al. | 250/311 |
| 7,559,047 B2 | 7/2009 | Miyamoto et al. | |
| 7,679,055 B2 * | 3/2010 | Sutani et al. | 250/307 |
| 7,796,801 B2 * | 9/2010 | Kitamura et al. | 382/141 |
| 7,817,844 B2 * | 10/2010 | Kitamura et al. | 382/141 |
| 2002/0015518 A1 | 2/2002 | Matsuoka | |
| 2006/0193508 A1 | 8/2006 | Sutani et al. | |
| 2007/0221842 A1 | 9/2007 | Morokuma et al. | |
| 2008/0099676 A1 | 5/2008 | Sasajima et al. | |
| 2008/0224035 A1 | 9/2008 | Sutani et al. | |
| 2009/0032707 A1 | 2/2009 | Sato et al. | |
| 2009/0110261 A1 | 4/2009 | Yang | |

FOREIGN PATENT DOCUMENTS

| | | |
|---|---|---|
| EP | 0 890 983 A1 | 1/1999 |
| JP | 08-181053 | 7/1996 |
| JP | 2001-338304 | 12/2001 |
| JP | 2002-031525 | 1/2002 |
| JP | 2003-158163 | 5/2003 |

OTHER PUBLICATIONS

Japanese Office Action issued in Japanese Patent Application No. JP 2006-235876 dated Oct. 25, 2011.

* cited by examiner

PATTERN DISPLACEMENT MEASURING METHOD AND PATTERN MEASURING DEVICE

This application is a Continuation of U.S. application Ser. No. 11/892,675, filed on Aug. 24, 2007, now U.S. Pat. No. 7,679,055, claiming priority of Japanese Patent Application No. 2006-235876, filed on Aug. 31, 2006, the entire contents of each of which are hereby incorporated by reference.

BACKGROUND OF THE INVENTION

The present invention relates to a pattern measuring method and a charged particle radiation apparatus, and more particularly to a method and apparatus for measuring a displacement between a line chart based on design data and a charged particle radiation image.

There are known technologies for detecting a pattern defect on a semiconductor wafer or a photoreticle by using semiconductor circuit design data. Since the circuit design data shows an ideal shape of a subject semiconductor pattern, it is possible to evaluate the performance of a semiconductor manufacture process through comparison with this pattern. JP-A-2001-338304 (corresponding to U.S. Pat. No. 6,868,175) and JP-A-2002-31525 (corresponding to US 2002/0015518) disclose that a deformation amount of a pattern from design data is detected by detecting edges of a subject inspection pattern and a reference pattern and comparing the detected edges.

Many semiconductor devices have a multilayer structure nowadays, and a superimposition precision between layers is an important measuring item. A performance of a semiconductor device depends largely upon a displacement between upper and lower layers of the semiconductor device including a composite pattern of the upper and lower layers. The displacement is therefore a very important evaluation item. However, the above-cited JP-A-2001-338304 (corresponding to U.S. Pat. No. 6,868,175) and JP-A-2002-31525 (corresponding to US 2002/0015518) do not intend to measure a displacement between patterns constituting a multilayer pattern.

SUMMARY OF THE INVENTION

It is an object of the present invention to provide an evaluation method and apparatus for evaluating a displacement between patterns shown by pattern images, by using design data representative of a plurality of patterns superimposed ideally.

According to one aspect of the present invention achieving the above object, there is provided a method and apparatus for measuring a first distance of an upper layer pattern between a line segment of design data and an edge of a charged particle radiation image, measuring a second distance of a lower layer pattern between a line segment of the design data and an edge of the charged particle radiation image, and detecting a superimposition displacement between the upper layer pattern and lower layer pattern in accordance with the first distance and second distance.

With the above-described arrangement, it is possible to evaluate a superimposition displacement between actually formed patterns, in accordance with design data superimposed ideally.

According to one example of the present invention, by using design data superimposed ideally as a reference, it becomes possible to evaluate a superimposition precision so that superimposition evaluation can be made at a high precision.

Other objects, features and advantages of the invention will become apparent from the following description of the embodiments of the invention taken in conjunction with the accompanying drawings.

DESCRIPTION OF THE INVENTION

Figure 1:
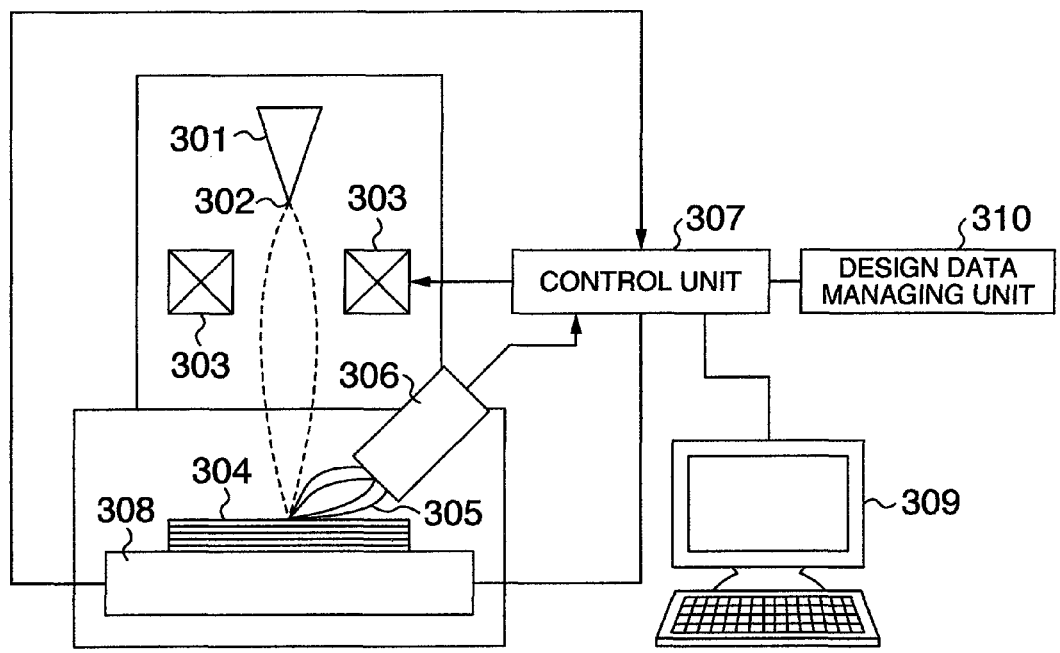
FIG. 1 is a diagram illustrating the outline of a scanning electron microscope.

Brief description will now be made on a scanning electron microscope (hereinafter called a SEM). In an electron optical system shown in FIG. 1, charged particle radiation (electron beam) 302 emitted from a charge particle source (electron gun) 301 is converged upon a sample 304 and scanned on the sample by a scanning coil 303 in an arbitrary sequence.

Secondary particles (e.g., secondary electrons) 305 generated at the surface of the sample 304 upon emission of the electron beam are detected with a secondary particle detecting unit 306, and are input as image data to a control unit (control processor) 307 having also an image processing function 307. The sample 304 can be moved in all three-dimensional directions by an X-Y-Z stage 308. The control unit 307 controls the charged particle source (electron gun) 301, scanning coil 303, secondary particle detecting unit 306, X-Y-Z stage 308 and also an image display device 309.

In this example, the scanning coil 303 makes the electron beam 302 scan the sample 304 two-dimensionally (along an X-Y direction). A signal detected with a secondary electron detector in the secondary particle detecting unit 306 is amplified by a signal amplifier in the control unit 307, thereafter transferred to an image memory (not shown), and displayed on the image display device 309 as a sample image. The secondary signal detector may be a detector for detecting secondary electrons and reflected electrons or a detector for detecting light or X-rays.

An address signal corresponding to a memory location in the image memory is generated in the control unit 307 or in an additionally installed computer, converted into an analog signal and supplied to the scanning coil. For example, if the image memory has 512×512 pixels, an address signal in an X-direction is a digital signal repeating from 0 to 511, and an address signal in a Y-direction is a digital signal repeating from 0 to 511 adding "1" each time the address in the X-direction changes from 0 to 511. The digital address signal is converted into an analog address signal.

Since the address of the image memory corresponds to the address in a deflection signal for scanning the electron beam, a two-dimensional image in the deflection area of an electron beam determined by the scanning coil is stored in the image memory. Signals in the image memory can be read sequentially by a read address generator circuit synchronized with a read clock. A signal read in correspondence with an address signal is converted into an analog signal which is used as a luminance modulation signal of the image display device 309.

The control unit 307 has an input device (not shown) for instructing to set an image capture condition (a scan speed and the number of accumulated images) and a visual field correction method, and to output and store an image.

The apparatus of the embodiment has a function of forming a line profile in accordance with detected secondary electrons, reflected electrons and the like. The line profile is formed in accordance with an electron detection quantity obtained by linearly or two-dimensionally scanning the primary electron beam or in accordance with luminance information or the like of a sample image. The formed line profile is used for measuring the size of, for example, a pattern formed on a semiconductor wafer.

In the description with reference to FIG. 1, although the control unit 307 is structured integrally with SEM or in the manner similar to this, obviously the control unit is not limited only to this structure, but a control processor may be provided separately from SEM to execute the processing as below. In this case, the control processor has input/output terminals and wirings for receiving a signal detected with the secondary signal detector and sending signals to a lens or a deflector and the like of SEM.

The apparatus of this embodiment stores in advance a recipe describing, for example, the conditions (measuring points, optical conditions of SEM and the like) to be adopted when measuring a plurality of points on a semiconductor wafer, and has a function of performing measurements and observations in accordance with the contents of the recipe.

A program for executing the processes in the following description may be registered in a storage medium, and the control processor for supplying necessary signals to SEM may execute this program. Namely, the following description is also applicable to a program or a program product capable of being adopted by a charged particle radiation apparatus such as SEM equipped with an image processor.

The control unit 307 is provided with a circuit design data managing unit 310 for storing pattern design data of a semiconductor wafer and converting the design data into data necessary for the control of SEM. The design data managing unit 310 has a function of writing the recipe for controlling SEM in accordance with design data of a pattern input from an input device (not shown) or the like. The design data managing unit has also a function of rewriting the recipe in accordance with signals supplied from the control unit 307. In the description of the embodiment, although the design data managing unit 310 is provided separately from the control unit 307, the embodiment is not limited thereto, but the control unit 307 and design data managing unit 310 may be structured integrally.

In this embodiment, a wafer at the intermediate process of manufacturing semiconductor devices was used as the sample 304. With this wafer, subject upper and lower layer patterns can be observed. Semiconductor circuit design data corresponding to two layer patterns was used as a comparison object of the two layer patterns.

The semiconductor circuit design data corresponds to an ideal pattern desired as a final semiconductor circuit pattern. In the following description, although the semiconductor wafer is used as the inspection object, the embodiment is not limited thereto if there is a pair of design data and an evaluation object. The format and type of the circuit design data are not limited so long as software for displaying the circuit design data can describe the format and process the circuit design data as figure data.

Figure 2:
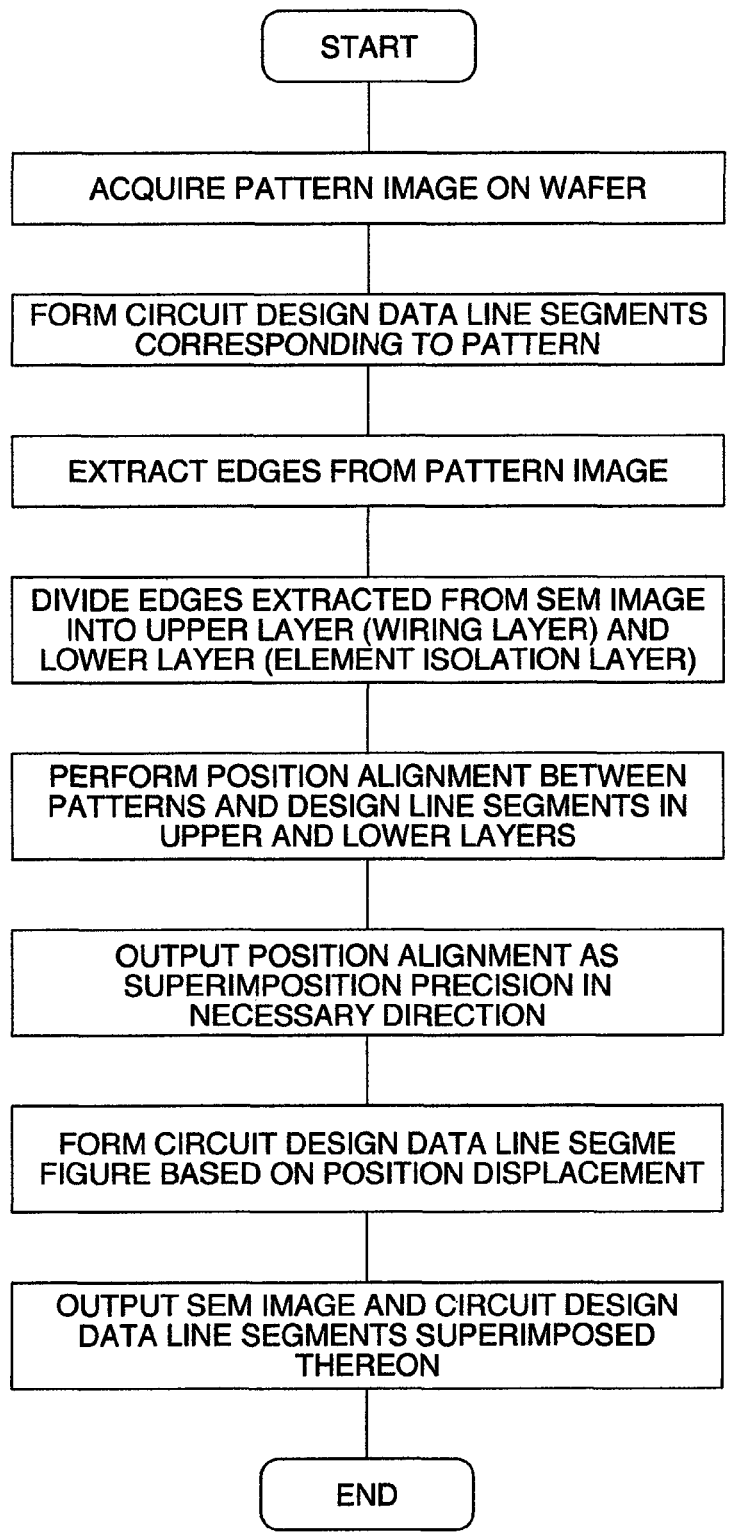
FIG. 2 is a flow chart illustrating an example of the operation sequence to be executed by the present invention.

The embodiment will be described with reference to the flow chart of FIG. 2. The sample wafer as the comparison object of circuit design patterns had an element isolation layer and wiring layer patterns formed thereon. The wiring layer after an etching process was used. This is because there exists an antireflection film or the like under resist after a lithography process, patterns of the element isolation layer under the antireflection film cannot be observed and a superimposition precision of two layers cannot be measured.

The measurements were conducted for four circuit design data sets shown in FIGS. 3 to 6. A visual field area of a SEM image was set to a square having a side length of 1 µm for all four circuit design data sets.

Next, template figures were formed from the circuit design data corresponding to the acquired pattern images. Generally, since the capacity of the circuit design data is large, line segments were extracted from each evaluation area to allow the circuit design data to be processed as a small file. Since files of the GDSII format were used as the circuit design data, SX-9000 manufactured by JEDAT INC. capable of processing this format was used as an editor for circuit design data.

Figure 3:
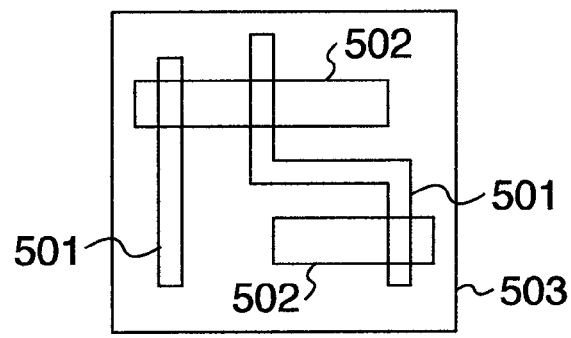
FIG. 3 is a diagram showing an example of design data.
Figure 7:
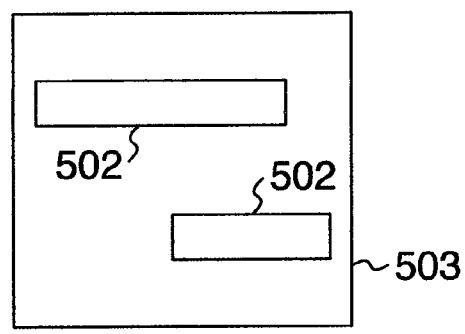
FIG. 7 is a diagram showing an example of lower layer design data patterns.

FIG. 3 shows design data patterns 501 of an upper layer and design data patterns 502 of a lower layer in an evaluation area 503. Figures of these two layers are separately shown in FIGS. 7 and 8. FIG. 3 is obtained by simply superimposing these line charts. The figures shown in FIG. 3 were not be able to be used as a template for position alignment because these patterns are superimposed stereoscopically on the wafer.

Patterns under the upper layer wiring patterns cannot be observed actually. In order to form template figures to be used in the embodiment, the figure calculation process was executed in the following manner, by using as an example the circuit design data shown in FIG. 3.

Figure 9:
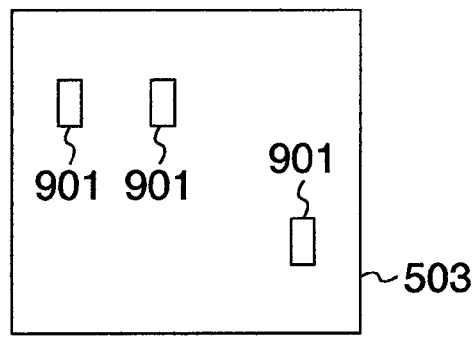
FIG. 9 is a diagram showing an extraction example of superimposition portions between the upper and lower layer design data patterns.

The results of extracting the superimposed areas of both the figures are superimposed areas 901 of the upper and lower layer patterns shown in FIG. 9. An image shown in FIG. 10 was obtained by removing the superimposed areas 901 from the design data patterns 502 of the lower layer.

Figure 10:
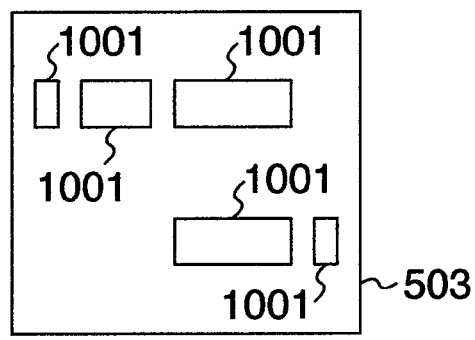
FIG. 10 is a diagram showing an example of lower layer design data patterns removing the superimposition portions shown in FIG. 9.
Figure 11:
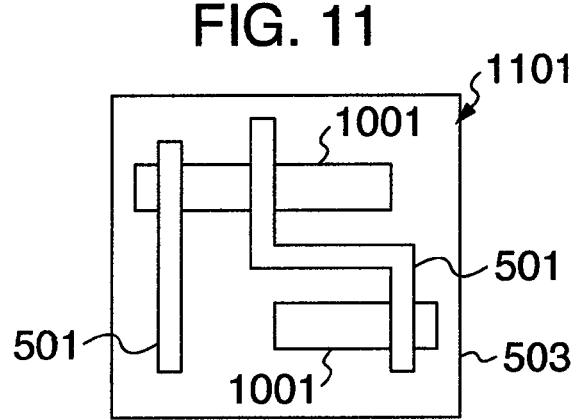
FIG. 11 is a diagram showing an example of the upper layer design data patterns superimposed upon the patterns shown in FIG. 10.

As the design data patterns 501 of the upper layer was superimposed on the lower layer patterns 1001 in FIG. 10 after removing the superimposed areas, a template 1101 shown in FIG. 11 was obtained.

Figure 8:
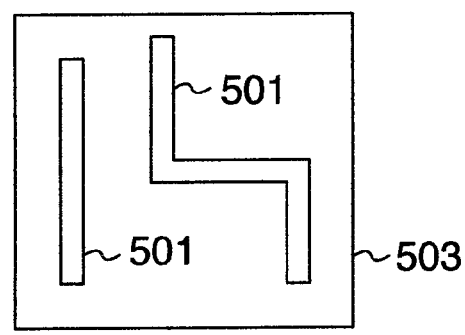
FIG. 8 is a diagram showing an example of upper layer design data patterns.

In this manner, the template was formed for the circuit design data figures corresponding to the pattern images on a wafer. In this template, figures belonging to the upper layer are partitioned from figures belonging to the lower layer. FIG. 8 shows line segments of the upper layer, and FIG. 10 shows line segments of the lower layer. In this embodiment, coordinate values of vertices of each figure were output from SX-9000 as a text file. This text file was used as a template figure.

Figure 12:
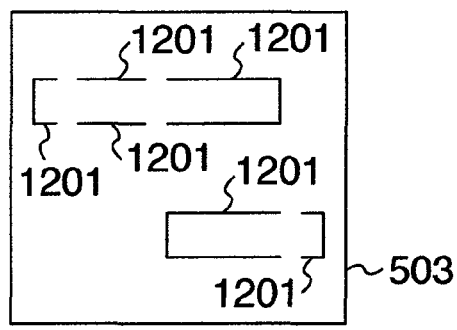
FIG. 12 is a diagram showing an example of the superimposed patterns shown in FIG. 11 extracting only the lower layer patterns.

In this text file, vertices included in the upper layer design data patterns 501 shown in FIG. 8 and in the lower layer figures 1201 shown in FIG. 12 were stored distinguishably.

Figure 13:
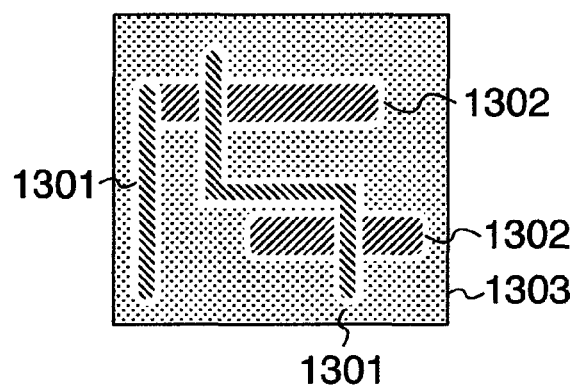
FIG. 13 is a diagram showing an example of a SEM image.

FIG. 13 shows a SEM image 1303 corresponding to the evaluation area 503 shown in FIG. 3. Displayed in the SEM image 1303 are upper patterns 1301 and lower patterns 1302 thereof.

Figure 14:
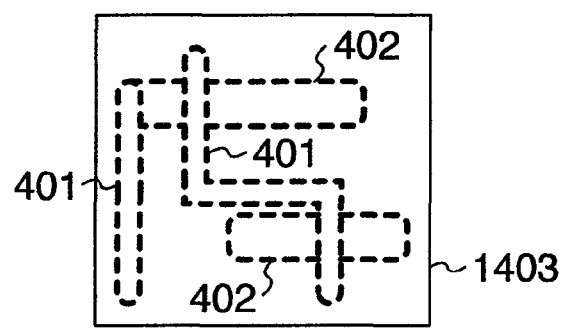
FIG. 14 is a diagram showing an example of edges extracted from the SEM image.

In the SEM image 1303 shown in FIG. 13, upper and lower layer patterns are displaced from the design data patterns. FIG. 14 is a diagram showing an edge image 1430 extracting edge components of the SEM image 1303. SEM edges 1401 of the upper layer patterns and SEM edges 1402 of the lower layer patterns are displayed in the edge image 1403.

Figure 15:
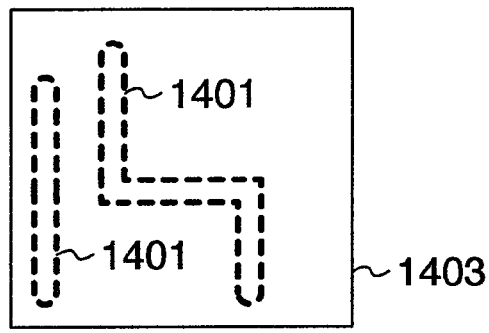
FIG. 15 is a diagram showing SEM edges of the upper layer patterns.
Figure 16:
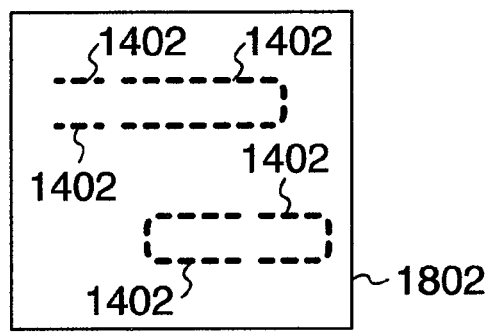
FIG. 16 is a diagram showing SEM edges of the lower layer patterns.

The edges extracted from the SEM image in the above manner are divided in the unit of layer. FIG. 15 shows an image extracted from the SEM edges 1401 of the upper layer patterns, and FIG. 16 shows an image extracted from the SEM edges 1402 of the lower layer patterns.

Figure 17:
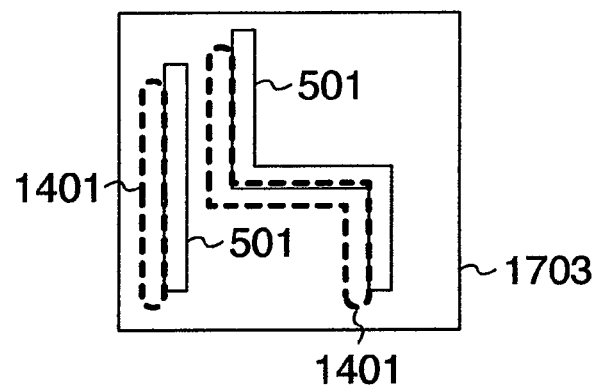
FIG. 17 is a diagram showing a superimposition example of the design data patterns and SEM edges.

A synthesized image 1703 shown in FIG. 17 was obtained by superimposing the SEM edges 1401 of the upper layer extracted from the SEM image area 1303 upon the design data patterns 501 of the upper layer, by making center coordinates of two images be coincide with each other. Since there is a displacement of the coordinated values of the SEM edges and the design data patterns, it is necessary to perform matching (position alignment) therebetween.

In this example, as one approach to position alignment, matching is performed in accordance with a position where a matching score of center-of-mass distribution images of two patterns of comparison objects becomes maximum.

Figure 18:
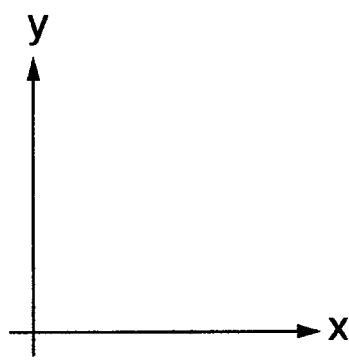
FIG. 18 is a diagram illustrating the definition of an X-Y coordinate system.

An X-Y coordinate system shown in FIG. 18 was defined by using as an origin a lower left point of an SEM image. The optimum matching position for the upper layer was obtained by displacing −88.4 nm in the X-direction and −76.2 nm in the Y-direction.

Figure 19:
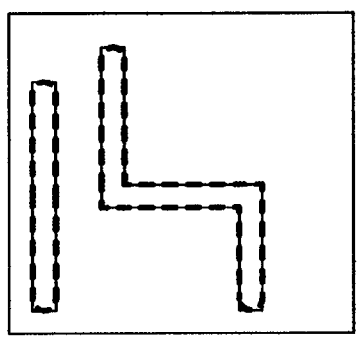
FIG. 19 is a diagram showing an example of matching between the design data patterns and SEM edges.
Figure 20:
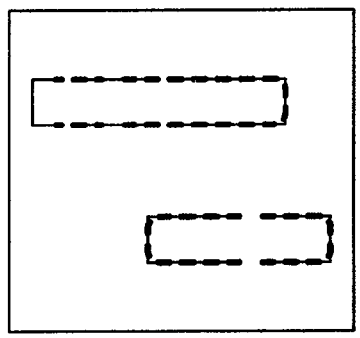
FIG. 20 is a diagram showing an example of matching between the lower layer design data and SEM edges.

FIG. 19 is a diagram showing both the line segments superimposed one upon the other at the obtained matching positions. Similarly, for the lower layer, matching was performed by displacing −4.7 nm in the X-direction and +2.5 nm in the Y-direction. FIG. 20 is a diagram showing both the line segments superimposed one upon the other at the obtained matching positions.

As described above, the matching position of the upper layer and the matching position of the lower layer were different in each evaluation area. The upper layer patterns and lower layer patterns of the design data have the ideal position relation values. Since the SEM edges of the upper and lower layers are not necessarily formed ideally, if the positions of line segments of the design data are aligned with the SEM edges of the upper or lower layer, the positions of the SEM edges of the other layer are displaced.

A superimposition displacement of the upper and lower layers can be obtained from a difference between the matching positions. A superimposition displacement in the X-direction is (−88.4 nm)−(−4.7 nm)=−83.7 nm, and a superimposition displacement in the Y-direction is (−76.2 nm)−(+2.5 nm)=−78.7 nm.

In this embodiment, a superimposition displacement was obtained by using as a reference the positions of the lower layer. Namely, the upper layer is superimposed upon the lower layer in a displaced state by this value in the SEM image.

Figure 21:
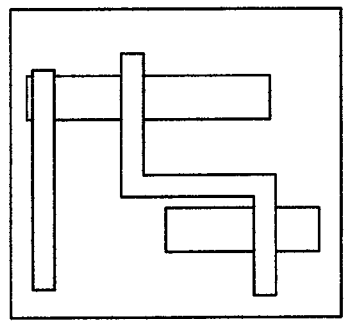
FIG. 21 is a diagram showing an example of a template with a superimposition displacement.
Figure 22:
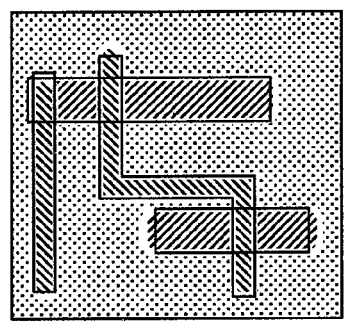
FIG. 22 is a diagram showing an example of matching between a template figure and an SEM image.

A template figure was formed in which the upper and lower layers are displaced by this superimposition displacement, relative to the circuit design data. FIG. 21 shows this template figure. The above-described method was used as a method including figure processing and the like. FIG. 22 shows the template figure and SEM image after matching.

Figure 4:
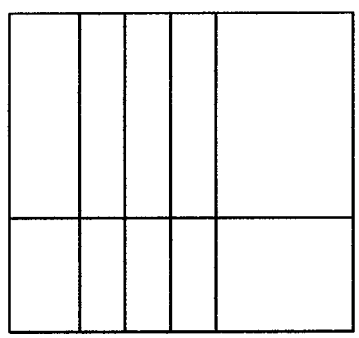
FIG. 4 is a diagram showing another example of design data.
Figure 5:
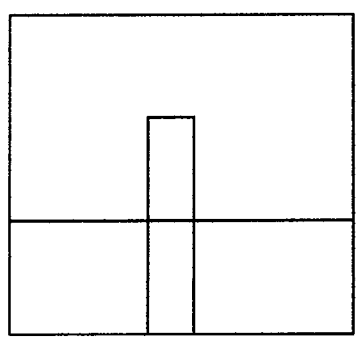
FIG. 5 is a diagram showing another example of design data.
Figure 6:
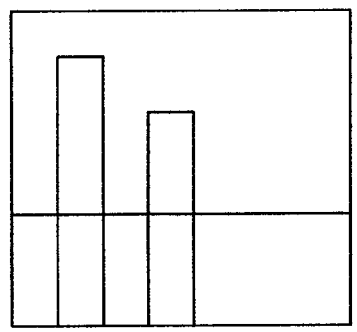
FIG. 6 is a diagram showing another example of design data.
Figure 23:
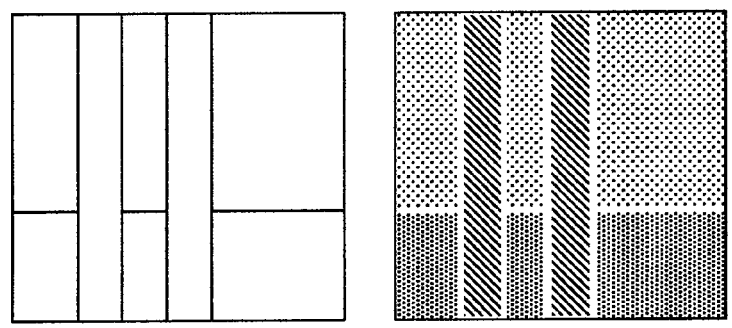
FIG. 23 is a diagram showing an example of a template and a corresponding SEM image.
Figure 24:
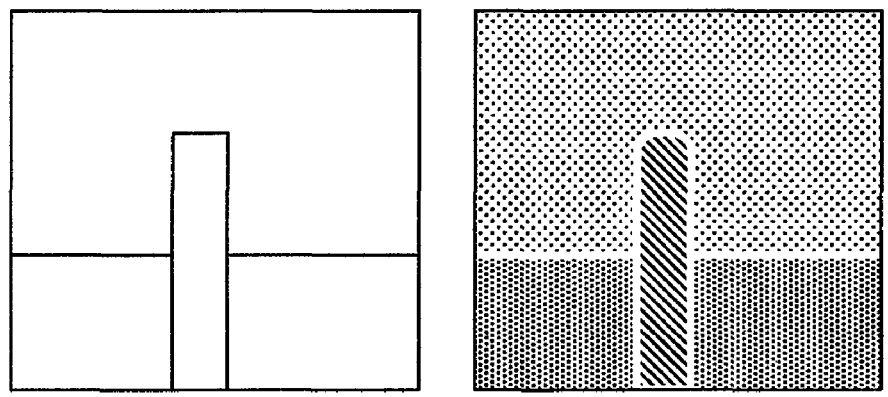
FIG. 24 is a diagram showing another example of a template and a corresponding SEM image.
Figure 25:
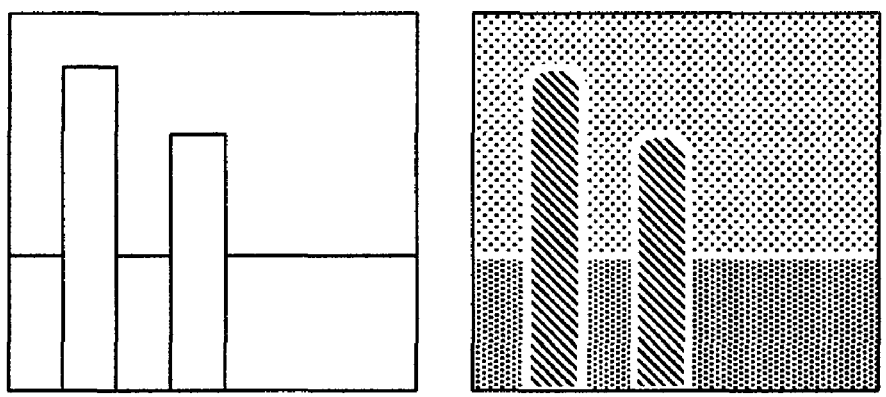
FIG. 25 is a diagram showing another example of a template and a corresponding SEM image.

Next, templates without a superimposition displacement were formed for the evaluation areas shown in FIGS. 4 to 6, by the method similar to that described above, and corresponding SEM images were acquired. FIGS. 23 to 25 show templates (left) and SEM Images (right) for the evaluation areas, respectively. In these evaluation areas, some evaluation area did not have a line segment in one of the X- and Y-directions or in both directions. It was therefore confirmed whether it is meaningful to calculate a superimposition displacement.

If the circuit design data of both the upper and lower layers has any line segment in both the X- and Y-directions, it was confirmed whether the following three conditions were satisfied.

(1) "Whether the line segment has a length of a twofold or longer of a design rule", (2) "whether there are a plurality of line segments in each direction", and (3) "whether a line segment in the X-direction has different start and end point Y-coordinate values, and whether a line segment in the Y-direction has different start and end point X-coordinate values".

It was confirmed whether the line segment of the circuit design data and the line segment of the SEM image in the upper and lower layers satisfied these conditions in each of the X- and Y-directions. If the upper or lower layer of the circuit design data does not have a line segment in one of the X- and Y-directions, there is no reference in this direction. It was therefore judged that a superimposition displacement cannot be obtained.

In the evaluation area shown in FIG. 23, the upper layer has only line segments in the Y-direction, and the lower layer has only a line segment in the X-direction. Since the above-described condition is not satisfied, a superimposition displacement was not output.

In the evaluation area shown in FIG. 24, although the upper layer has line segments in both the X- and Y-directions, a length of the line segment in the X-direction is shorter than 180 nm which is a twofold of a design rule of 90 nm. Since the above-described condition is not satisfied, a superimposition displacement was not output.

In the evaluation area shown in FIG. 25, although the upper layer has line segments in the X-direction shorter than a twofold of the design rule, two line segments have different Y-coordinate values so that the above-described condition is satisfied. The lower layer had also a line segment longer than a twofold of the design rule. However, the lower layer had not a line segment in the X-direction. In this case, a superimposition displacement only in the Y-direction was output.

In this embodiment, the line segment condition that a length is a twofold or longer of the design rule of a wafer, is used. The value may be a variable value depending upon the exposure condition of a wafer. In an evaluation area other than those described above, the above-described conditions are used to judge whether a superimposition displacement is to be output or not.

As described so far, for the circuit design data and SEM image constituted of upper and lower two layers, a superimposition displacement between two layers is calculated, and each of the upper and lower layers is independently subject to matching. It was therefore possible to output an image having the circuit design data line segments superimposed upon the SEM image in a position alignment manner.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A pattern displacement measuring method of measuring a distance between a line segment of design data and an edge of a charged particle radiation image, the method comprising steps of:
by way of a control unit:
   executing a first template matching by using a first template in which an upper layer pattern is selectively expressed;
   calculating a first displacement in accordance with the first template matching;
   executing a second template matching by using a second template in which a lower layer pattern is selectively expressed;
   calculating a second displacement in accordance with the second template matching; and
   calculating a superimposition displacement between the upper layer pattern and the lower layer pattern in accordance with the first displacement and the second displacement.

2. A pattern measuring apparatus comprising:
a control unit for measuring a size of a pattern formed on a sample, by scanning an electron beam emitted from an electron source and using electrons emitted from the sample, wherein:
the control unit:
   executes a first template matching by using a first template in which an upper layer pattern is selectively expressed,
   calculates a first displacement in accordance with the first template matching;
   executes a second template matching by using a second template in which a lower layer pattern is selectively expressed;
   calculates a second displacement in accordance with the second template matching; and
   calculates a superimposition displacement between the upper layer pattern and the lower layer pattern in accordance with the first displacement and the second displacement.

3. The pattern measuring apparatus according to claim 2, wherein the control unit:
   divides a pattern into the upper layer pattern and the lower layer pattern, and
   measures a distance between a line segment obtained in accordance with design data and an edge of an image obtained in accordance with electrons emitted from the sample.

4. The pattern measuring apparatus according to claim 2, wherein:
   the control unit executes the second template matching by using a template removing a line segment of the lower layer pattern in an area where the upper layer pattern and the lower layer pattern of the design data are superimposed.

* * * * *